United States Patent [19]
Greiter

[11] Patent Number: 6,135,908
[45] Date of Patent: Oct. 24, 2000

[54] ENWRAPPING DEVICE

[75] Inventor: Ivo Greiter, Ottersweier, Germany

[73] Assignee: LuK Getriebe-Systeme GmbH, Buhl/Baden, Germany

[21] Appl. No.: 09/312,384

[22] Filed: May 14, 1999

[30]   Foreign Application Priority Data

May 20, 1998 [DE] Germany ............................ 198 22 664

[51] Int. Cl.[7] .............................. F16G 5/20; F16G 13/02; F16G 13/04

[52] U.S. Cl. .......................... 474/215; 474/206; 474/212; 474/202

[58] Field of Search ..................................... 474/202, 206, 474/212, 213, 214, 215

[56]   References Cited

U.S. PATENT DOCUMENTS

| | | | |
|---|---|---|---|
| 4,581,001 | 4/1986 | Rattunde et al. | 474/215 |
| 5,372,554 | 12/1994 | Okuda | 474/215 |
| 5,651,746 | 7/1997 | Okuda | 474/215 |
| 5,941,059 | 8/1999 | Kanehira et al. | 474/215 |

*Primary Examiner*—David Fenstermacher
*Assistant Examiner*—Matthew A. Kaness
*Attorney, Agent, or Firm*—Darby & Darby

[57]   ABSTRACT

An endless flexible torque-transmitting device such as a chain belt in a continuously variable transmission of a motor vehicle has an improved arrangement of the chain links that provides a better distribution of the load between the individual links and thereby increases the torque- and power-transmitting capacity of the endless flexible torque-transmitting device.

24 Claims, 7 Drawing Sheets

State of the Art

ENWRAPPING DEVICE

BACKGROUND OF THE INVENTION

The invention relates to an endless flexible torque-transmitting device with links that are connected to force-transfer elements, as used in particular in a continuously variable transmission of a motor vehicle where the endless flexible torque-transmitting device is arranged in the torque flow between a first and a second pair of conical disks. The force-transfer elements, serving to transmit lengthwise-oriented forces, are distributed at intervals along a circumference of the endless flexible torque-transmitting device. The links have openings that are traversed by the force-transfer elements, whereby columns of links are formed in the lengthwise direction of the endless flexible torque-transmitting device and the number and widths of the columns in the transverse direction define the width of the endless flexible torque-transmitting device.

Endless flexible torque-transmitting devices of this kind are known from the German patent DE-PS 33 24 318, among others. Link chains in accordance with the referenced patent are made up of force-transfer elements that may comprise a single element or a set of at least two rocker elements that roll on each other. The force-transfer elements are in compressive contact with the conical disks, employing the frictional forces between the force-transfer elements and the conical disks to transmit a torque from the first to the second pair of conical disks. The transmission ratio can be increased or decreased in a continuous range by varying the distance between the disks in each pair of conical disks. The force-transfer elements are connected to each other through links. The connection is made by means of openings in the links through which the force-transfer elements extend. To optimally distribute the forces transmitted by the endless flexible torque-transmitting device, a multitude of links is used with each force-transfer element. In most cases, the links are arranged in a triple-link array, as described in the German patent 30 27 834, to reduce noise and achieve small chain radii and to thereby increase the transmission ratio.

Because the force-transfer elements have only a finite stiffness and because of system vibrations, the links carry unequal loads, which leads to the destruction of links primarily in the border zones. Doubling up the most highly stressed links or reinforcing them by increasing their thickness or by increasing the strength of the link material alleviates the problem, but then, with arrangements of this kind, the breakage of links will occur primarily in the immediate vicinity of the reinforcement. Thus, the aforementioned measures do not assure an unequivocal improvement, because they cannot fully compensate for the non-uniformity of the load distribution, meaning that the distribution of the tensile forces is still not sufficiently homogeneous. In addition, when using reinforced links, the reproducibility of the hardening process between the different kinds of links is poor, so that the quality assurance with regard to the dimensional integrity of the endless flexible torque-transmitting device becomes more difficult and manufacturing costs are increased because the parts have to be inspected.

OBJECT OF THE INVENTION

The object of the present invention is to provide an endless flexible torque-transmitting device that offers a better distribution of the load between the individual links, i.e., an endless flexible torque-transmitting device in which the border zones have an improved, more homogeneous configuration, thus providing an endless flexible torque-transmitting device of a higher and more uniform torque- and power-transmitting capacity. Additional objectives are to improve economy and simplicity in the manufacturing process of the endless flexible torque-transmitting device, and to reduce the number of rejects and the requirement for quality inspections by providing for a uniform treatment of the parts.

SUMMARY OF THE INVENTION

The foregoing objective is met by an endless flexible torque-transmitting device that is arranged in the torque flow between a first arid second pair of conical disks, has links connected to force-transfer elements, and is characterized by the following features:

the force-transfer elements for transmitting forces along the lengthwise direction of the endless flexible torque-transmitting device are aligned perpendicular to the lengthwise direction and distributed at intervals along a circumference of the endless flexible torque-transmitting device;

the links have openings that are traversed by the force-transfer elements, whereby columns of links are formed in the lengthwise direction of the endless flexible torque-transmitting device;

the endless flexible torque-transmitting device is the aggregate of the link columns and is divided across its width (transverse to the lengthwise direction) into an inner zone and two border zones;

positions are defined within the endless flexible torque-transmitting device by respective pairs of neighboring force-transfer elements. A first position falls between a neighboring second position and a neighboring third position, so that in relation to the first position, the second position is transposed by one force-transfer element interval and the third position is transposed by two force-transfer element intervals. As the sequence of three positions is repeated in uniform periodicity in the lengthwise direction and the links within a given column all occupy the same position, the columns become identifiable by the position that is occupied by the links in any given column;

in the occupancy pattern that is defined by the positions occupied by the link columns across the width of the endless flexible torque-transmitting device, the pattern of at least one border zone is distinguishable from the occupancy pattern of the inner zone.

The objective may further be met by an embodiment of the endless flexible torque-transmitting device with the following characteristic features:

The endless flexible torque-transmitting device, used in particular in a continuously variable motor-vehicle transmission where it is arranged in the torque flow between a first and second pair of conical disks, has links that are connected to force-transfer elements;

the force-transfer elements for transmitting forces along the lengthwise direction of the endless flexible torque-transmitting device are aligned perpendicular to the lengthwise direction and distributed at intervals along a circumference of the endless flexible torque-transmitting device;

the links have openings that are traversed by the force-transfer elements, whereby columns of links are formed in the lengthwise direction of the endless flexible torque-transmitting device;

the endless flexible torque-transmitting device is the aggregate of a multitude of link columns and is divided across its width (transverse to the lengthwise direction) into an inner zone and two border zones;

positions a, b, c are defined within the endless flexible torque-transmitting device by respective pairs of neighboring force-transfer elements. Each first position a falls between a neighboring second position b and third position c so that, in relation to the first position a, the second position b is transposed by one force-transfer element interval and the third position c is transposed by two force-transfer element intervals. As the sequence of three positions a, b, c is repeated in uniform periodicity in the lengthwise direction and the links within a given column all occupy the same position, the columns become identifiable by the position a, b, or c that is occupied by the links in any given column;

looking across the endless flexible torque-transmitting device in the transverse direction, the pattern of link columns starting from one border zone is arranged in an order other than a, b, c, a.

The invention is based on the observation that unexpectedly, regardless of the state-of-the-art practice of using a symmetric chain configuration and reinforcing individual links, higher loads now occur in other links and, as a consequence, the links of state-of-the-art endless flexible torque-transmitting devices are still over-dimensioned in relation to those links that carry the largest load in a given case. This points to the feasibility of using an optimization process in accordance with the invention to provide endless flexible torque-transmitting devices combining narrower width (transverse to the running direction) with equal or better power-transmitting capacity or combining a significantly increased power-transmitting capacity with an unchanged width.

Within the inventive concept, it may nevertheless be advantageous if at least one link column across the transverse width of the device is occupied by two links or a reinforced link. However, this does not change the occupancy pattern at the respective position, because the occupancy pattern applies to the position occupied by each column regardless of how many links are used at a position. It may also be advantageous to include several link columns of the aforementioned kind in either the inner zone and/or one or both of the border zones.

An endless flexible torque-transmitting device according to the invention is advantageously based on a triple-link array in which positions identified as "a" periodically repeat themselves along the lengthwise direction of the endless flexible torque-transmitting device, with positions "b" transposed from "a" by one force-transfer element interval in the lengthwise direction and positions "c" transposed from "a" by two force-transfer element intervals. In this arrangement, it may be advantageous if the intervals between the force-transfer elements are not uniform. A configuration of non-uniform intervals can significantly improve the noise properties of an endless flexible torque-transmitting device such as a link chain.

It is advantageous if the occupancy pattern of the border zones is largely independent of the pattern of the inner zone of the endless flexible torque-transmitting device, meaning that the occupancy pattern of the border zones according to the invention is different from the occupancy pattern of the inner zone. As the simplest embodiment of this idea, a symmetric configuration of the border zones on both sides of the inner zone may be advantageous. To improve the uniformity of the tensile forces acting in the different links and to stabilize the endless flexible torque-transmitting device, it can be advantageous to allocate even as few as two columns (starting from the outermost border column) to a different occupancy pattern than the inner zone, e.g., by configuring a border zone with a position "a" followed by a position "b" before switching over to a c-b-a pattern that continues towards the inside and is assigned to the inner zone.

In order to stabilize a position, the link column associated with it can be reinforced, e.g., by doubling the links or by making them thicker. The strengthening of positions is advantageous in the border zones and/or the inner zone. It may also be advantageous to use a plurality of thin links (e.g., thinner that the rest of the links used in the endless flexible torque-transmitting device) in a link column of a given position, e.g., for the purpose of meeting special noise-reduction and strength requirements. To strengthen a link, it can be advantageous if the thickness of the strengthened link is less than the combined thickness of two regular links, so that the endless flexible torque-transmitting device is further optimized in its ability to absorb and compensate forces of a magnitude between one and two nominal link loads.

Particularly advantageous endless flexible torque-transmitting devices with one or two border zones in accordance with the invention are obtained with an occupancy pattern with at least the sequence a, b, c, b, starting at the outermost border column and proceeding towards the inner zone. In this arrangement, the pattern of the inner links, within reasonable limits, is to a large extent of no consequence. The best results are obtained with an advantageously expanded specification of the pattern, starting at the outermost border column and proceeding towards the inner zone, in the order a, b, c, b, c, and with a yet further expanded specification in the order a, b, c, b, c, a, oriented as before from the outermost border column towards the middle.

A further concept according to the invention shows that the proposed occupancy pattern can also be particularly advantageous in the case where in at least one of the border zones the links are strengthened and/or doubled up in the third and/or fifth link column, counting from the outermost border column towards the middle.

As described above, it can be of advantage if the border zones have a different configuration from the inner zone. The inner zone, too, can benefit from further developed configurations in which, e.g., the order of the positions occupied by links proceeds symmetrically from a median link column towards both border zones according to an a-b-c or a-c-b pattern that repeats itself from the median towards the outside up to the point where the border zone begins. Symmetric arrangements of this kind can be advantageous in an endless flexible torque-transmitting device that has an odd number of columns across its width where (as has just been described) the inner zone has a mirror-symmetric order of occupied positions in relation to a median column that occupies an arbitrarily selectable position. Nevertheless, there can also be an advantage in asymmetric arrangements, i.e., where the patterns on opposite sides of a median column are not mirror images of each other. In this case, the positions occupied by the link columns are asymmetric with regard to a median line of the endless flexible torque-transmitting device and repeat themselves in an internal periodic pattern from one border zone to the other.

To improve the tensile properties of the endless flexible torque-transmitting device, it can furthermore be of advantage to start with a certain pattern of occupied positions, then insert a separator position (boundary position), i.e., an arbitrary position that does not continue the initial pattern, subsequently continue with a repetition of the initial pattern, and then follow up again with a boundary column occupying either the same or a different position. This means that occupancy patterns in the order of, e.g., a-b-a and/or b-c-b and/or c-b-c can be arranged in the inner zone where, e.g., the triplet of positions c, b, c is separated by a position a from the next triplet c, b, c (it makes no difference whether the pattern is defined from the border zone to the median or in the opposite direction). Patterns arranged in the order a-c-a and/or c-a-c can likewise by advantageous either by themselves or in combination with other patterns.

It can further be advantageous to use an occupancy pattern, either by itself or in combination with other patterns, in which at least one triplet of positions a-b-c, b-c-a, c-b-a and/or one of the pairs c-a or a-c are occupied by links in the inner zone.

Further in embodiments according to the invention, the inner zone can have an occupancy pattern based on a combination of the patterns that have been described in the context of both the symmetric as well as the asymmetric configuration of the inner zone. In a case where it is advantageous to distinguish only one of the border zones from an asymmetric inner zone, the non-distinguished border zone is included in the inner zone.

Even embodiments in which the positions occupied by the link columns appear to be arranged in a totally arbitrary manner can be the result of an optimized design and therefore provide an advantage, e.g., in an arrangement that looks similar to a randomized order of occupied link positions. Here, too, the occupancy pattern of the inner zone is different from the occupancy pattern of the border zones in accordance with the invention.

In cases where the occupancy pattern of the links in the inner zone gives a largely unorganized appearance or has pronounced breaks in its symmetry, the border zones can be identified unequivocally as sequences of occupied positions in the order a-b-c-b-c. This arrangement, whose very beneficial effect has already been described above, has a structure that is specifically adapted to the border zones and is therefore not repeated in the inner zone.

The number of link columns that make up the width of the link formation in the transverse direction along the force-transfer elements is preferably based on the required tensile-load capacity. There is an advantage if the number of link columns is between 20 and 60, preferably between 25 and 45, with both even or odd numbers being permissible. With odd numbers, there can be an advantage in patterns that are symmetric with respect to a median link column.

Also, starting from a core of an odd plural number of link columns, three for example, forming the origin of a symmetric pattern, additional link columns can occupy symmetric positions with respect to the initial columns, proceeding in both directions transverse to the endless flexible torque-transmitting device towards the borders. With an even number of link columns, there can be an advantage in designing endless flexible torque-transmitting devices with an asymmetric occupancy pattern, which means that the link columns—using the example of a uniform pattern to illustrate the situation—occupy a particular sequence of positions in the left border zone and end with the same sequence of positions at the right border zone, while in between the two border zones, a pattern of identical sequences repeats itself over a number of periods that corresponds to the desired chain width.

In this context, embodiments with an even number of link-column positions are possible in which an even number of link columns—two, for example—are at the core of the symmetry (the invention teaches to treat doubled-up link positions as single links) and are adjoined on both sides by patterns that are mirror-symmetric in relation to the core columns. Also possible are embodiments with an odd number of link columns in the inner zone that do not have a plane of symmetry formed by a median link column, in which case the border zones, too, are configured asymmetrically in relation to each other.

The transition from border zone to inner zone does not have to be set by a clear-cut dividing line in every occupancy pattern. Rather, to achieve a smooth distribution of the tensile forces, it can be advantageous if the occupied link positions have fluid transition patterns that could be counted as part of either the inner zone or the border zone. Thus, the transition patterns can at the same time be part of a border zone and of the inner zone, meaning that the boundary between the two zones can have an indeterminate, transitional configuration.

The novel features that are considered as characteristic of the invention are set forth in particular in the appended claims. The improved apparatus itself, however, both in its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

The invention is explained below with details referenced against the attached drawing, where.

DETAILED DESCRIPTION OF THE INVENTION

Figure 1:
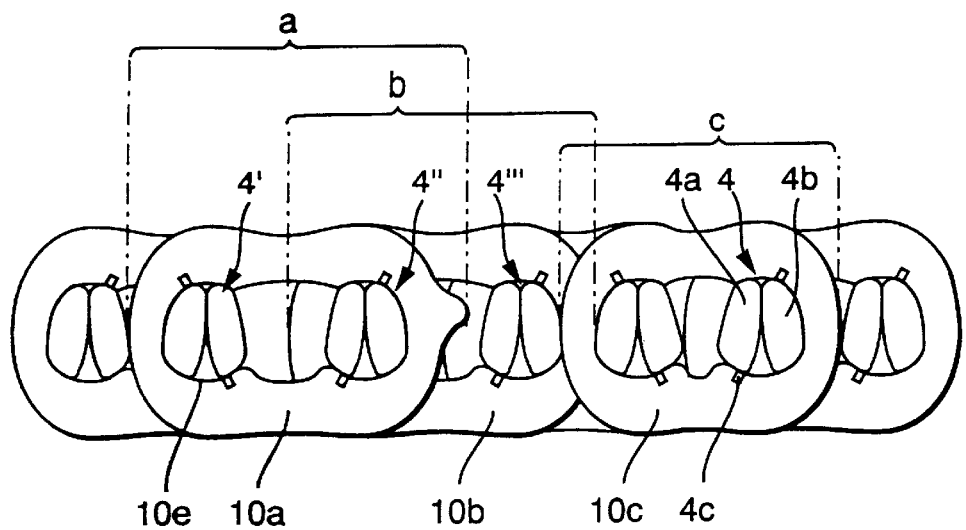
FIG. 1 represents a partial view of an embodiment of an endless flexible torque-transmitting device according to the invention.

FIG. 1 represents a segment of an endless flexible torque-transmitting device according to the invention, consisting of the links 10a, 10b, 10c that are traversed by the force-transfer elements 4. Each of the force-transfer elements 4 is divided into two rocker elements 4a, 4b that roll on each other in concert with the swiveling motions of the links 10a, 10b, 10c, thereby reducing the friction between the force-transfer elements and the links. To ensure that the links 10a, 10b, 10c cannot leave their places on the force-transfer elements 4, the ends of the force-transfer elements 4 are provided at the outside border with protrusions in the form of weld points 4c. The configuration of the endless flexible torque-transmitting device is based on a triple-link array, meaning that the links 10a, 10b, 10c occupy positions a, b, c in three distinct columns transverse to the running direction. For example, the outermost column of links consists of a link 10a with openings 10e engaged by force-transfer elements 4' and 4". The force-transfer element 4''' remains unoccupied. The two force-transfer elements 4 following next in sequence traverse a link 10c, whereupon a further unoccupied force-transfer element 4 follows and the sequence is continued with the alternation of further links 10a and 10c with interposed free force-transfer elements 4. In the adjacent sequence of links towards the center of the endless flexible torque-transmitting device, the force-transfer element 4' is unoccupied while the force-transfer elements 4" and 4'" engage a link 10b. Again in continuous repetitive alternation, the link 10b, after an unoccupied force-transfer element 4, is followed by a link 10c. From this arrangement, it is possible to derive the respective positions a, b, c that are occupied by the links 10a, 10b, 10c. The way in which the links 10a, 10b, 10c occupy the positions a, b, c across the width of the endless flexible torque-transmitting device transverse to the running direction defines the pattern of the endless flexible torque-transmitting device.

Figure 2:
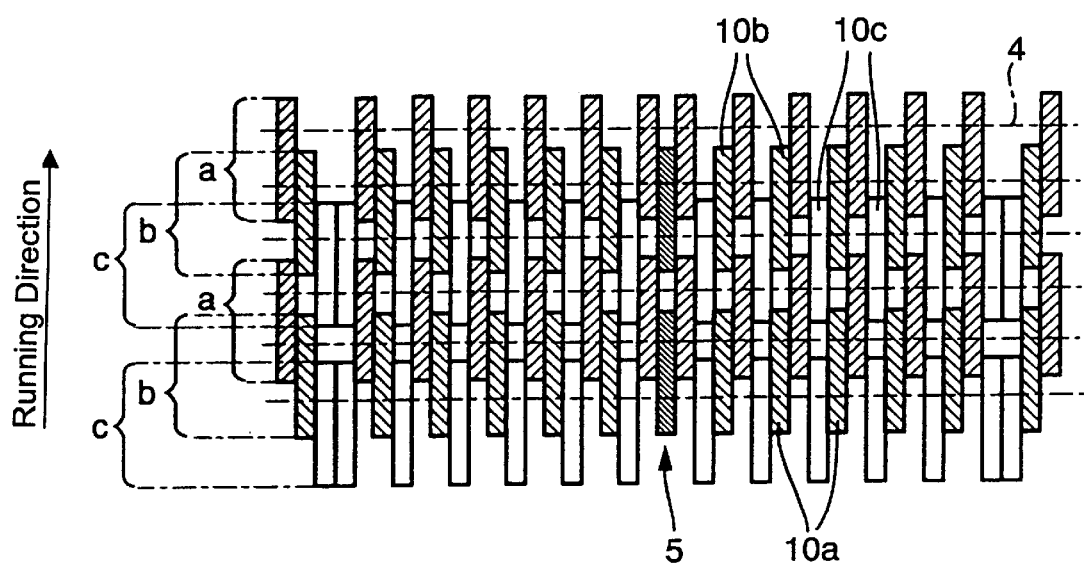
FIG. 2 represents a segment of an embodiment of an endless flexible torque-transmitting device according to the state of the art.

In the manner of a sketch, FIG. 2 represents a segment of an endless flexible torque-transmitting device based on a triple-link array in accordance with the state of the art. This type of endless flexible torque-transmitting device is distinguished by very small chain radii. Consequently, a larger transmission ratio is achievable in applications of the device in continuously variable transmissions in which the transmission ratio is controlled by varying the radial position of the endless flexible torque-transmitting device with respect to cone-pulley pairs. In principle, the links 10a, 10b, 10c in the triple-link array can be assigned to three positions that are arranged at different locations in relation to the lengthwise direction. The positions may be considered as lengthwise distance intervals of the links in the running direction. Each of the distance intervals is defined by two force-transfer elements. In FIGS. 2 to 13, the links 10, i.e., 10a, 10b, 10c, that occupy the respective positions a, b, c are identified by upward-diagonal shading (position a), downward-diagonal shading (position b) and no shading (position c). In this representation, the first position a is arbitrarily chosen and occupied by the links 10a; the position b is transposed by one force-transfer element 4 and occupied by the links 10b; and the position c, finally, is transposed by two force-transfer elements 4 and occupied by the links 10c. From the fourth force-transfer element 4 on, the continuing sequential order of the links 10a, 10b, 10c and of the positions a, b, c along the running direction (as indicated by the arrow in the lengthwise direction of the endless flexible torque-transmitting device) is a repetition of the illustrated arrangement. In state-of-the-art endless flexible torque-transmitting devices, the positions a, b, c from the leftmost to the rightmost border link (transverse to the running direction) are occupied by the links 10a, 10b, 10c in accordance with a sequential pattern that is indistinguishable from the border areas of the device. The embodiment of FIG. 2, in contrast, is based on a mirror-symmetric pattern with respect to a median column 5, where the order of the positions beginning from the median to either of the two borders is a-b-c. In FIG. 2, the links at the first position c from the outside are doubled up, but the sequential pattern of positions is not affected by this.

Figure 3:
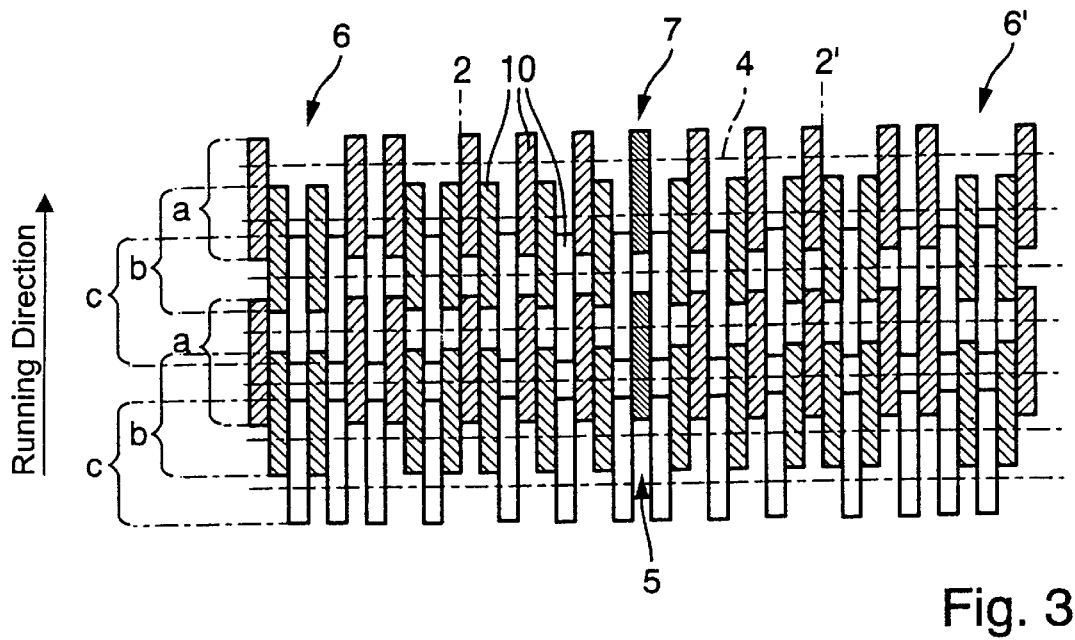
FIGS. 3 to 11 represent segments of embodiments of endless flexible torque-transmitting devices according to the invention with an odd number of links across the width of the link array.

FIG. 3 represents an analogous segment of an embodiment of an endless flexible torque-transmitting device according to the invention. The concept of the triple-link array as explained in the description of FIG. 1 is still applicable. In contrast to the state of the art, the arrangement of links 10 and force-transfer elements 4 has an inner zone 7 and two mirror-symmetric border zones 6, 6' separated by dash-dotted dividing lines 2, 2'. The inner zone 7 has a mirror-symmetric pattern with respect to the median link column, where the order of the positions beginning from the median towards either of the two border zones 6, 6' is c-b-a, repeated three times. The border zones 6, 6' are configured as mirror images of each other with a sequential pattern of a-b-c-b-c-a-c-a-b-c-b, beginning from the outer border to the inside. Particularly the part a-b-c-b-c at the outer edge of the border zone pattern is very advantageously adapted to the tensile forces that occur along the running direction indicated by the arrow in the drawing. The continuing pattern configuration is designed to compensate and optimize the formation of tensile forces in this area.

Figure 4:
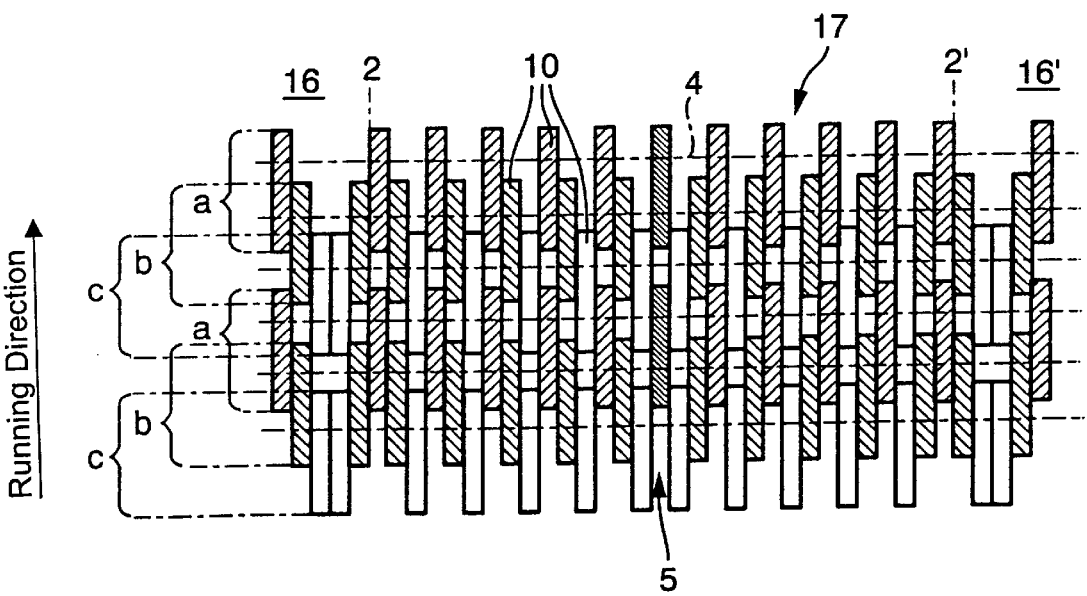

In a further embodiment according to FIG. 4, a similar endless flexible torque-transmitting device is again represented in a segment containing two cycles of the positional pattern for the arrangement of the links 10 on the force-transfer elements 4 along the running direction. The inner zone 17 which, in the drawing, is separated from the border zones 16, 16' by the dividing lines 2, 2', is comprised of the same groups of sequences a-b-c as the inner zone 7 of the embodiment of FIG. 3, except that the triad a-b-c is repeated four times. The border zones, again in a mirror-symmetric arrangement, are reduced in width and have the positional pattern a-b-c-a, in which the first position c from the border is occupied by a double link to better absorb the greater tensile forces occurring in this area in the running direction indicated by the arrow. Adjacent to the inside of the double link is one link in a position b that deviates from the pattern and makes up the end of the border zone 16, 16' before the pattern continues in a uniform repetition of the positions a, b, c in the inner zone 17.

Figure 5:
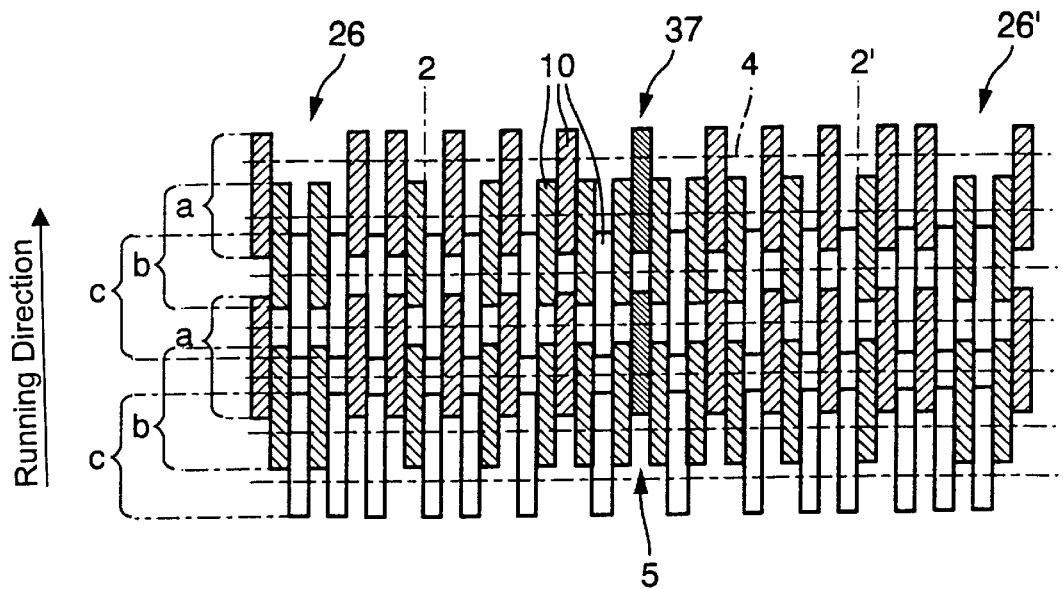
Figure 6:
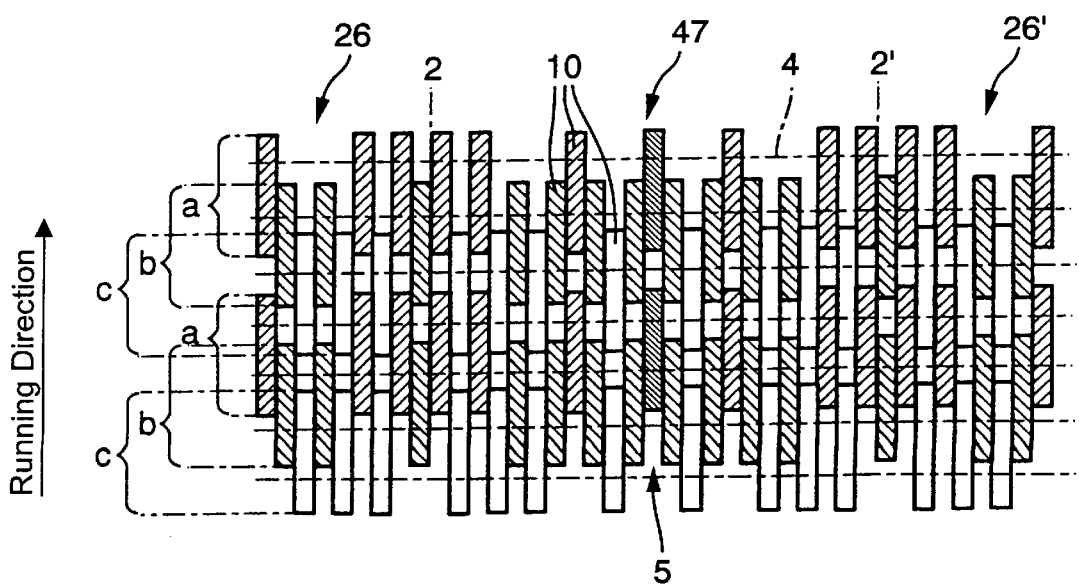
Figure 7:
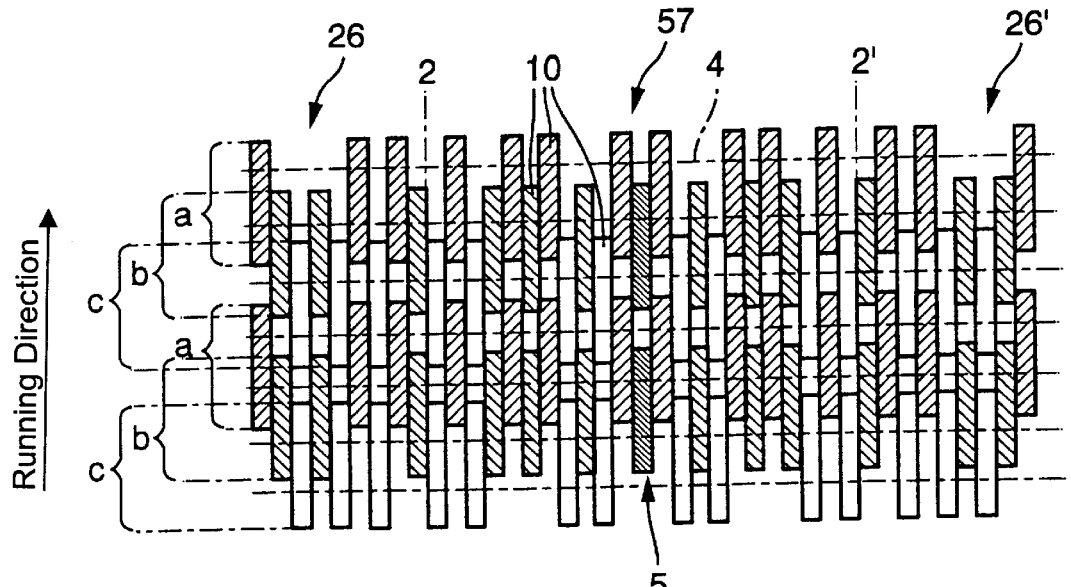

As a common trait, the embodiments of the FIGS. 5 through 9 have an odd number of 41 links transverse to the running direction and are arranged as triple-link arrays that are mirror-symmetric with respect to a median link column 5. In addition, the border zones 26 of the embodiments of the FIGS. 5 through 9 are identically configured as patterns of eight positions, whereby a very good, uniform distribution of the tensile forces in the two border zones 26, 26' is achieved. All positions are single-occupancy positions, i.e., occupied by one single link 10 per position along the force-transfer elements 4. The sequential pattern of the border zones 26, beginning at the outside border, is a-b-c-b-c-a-c-a-b, with the dividing lines 2, 2' indicating a transition zone that cannot always be exactly identified in terms of a single position, because in some cases it is possible to assign positions to either the border zones or to the inner zone. In contrast to the border zones, the inner zones 37, 47, 57, 67, 77, 87 differ among each other in the pattern of the positions occupied by the links 10, except that every position is always occupied by a single link. The arrangement shown in FIG. 5 is mirror-symmetric with respect to a median column 5 that is allocated to position a (thus, it is sufficient to describe one of the symmetrical halves, starting from the median column 5) and its sequential pattern of positions is b-c-b-a-b-c-a-b-c-a-c. In the analogously structured inner zone 47 of FIG. 6, the sequential pattern of positions is b-c-b-a-b-c-b-c-a. The inner zone 57 of FIG. 7, too, is arranged like the preceding embodiments, its sequential pattern of positions being a-c-b-c-a-b-a-b-c-a-c.

Figure 8:
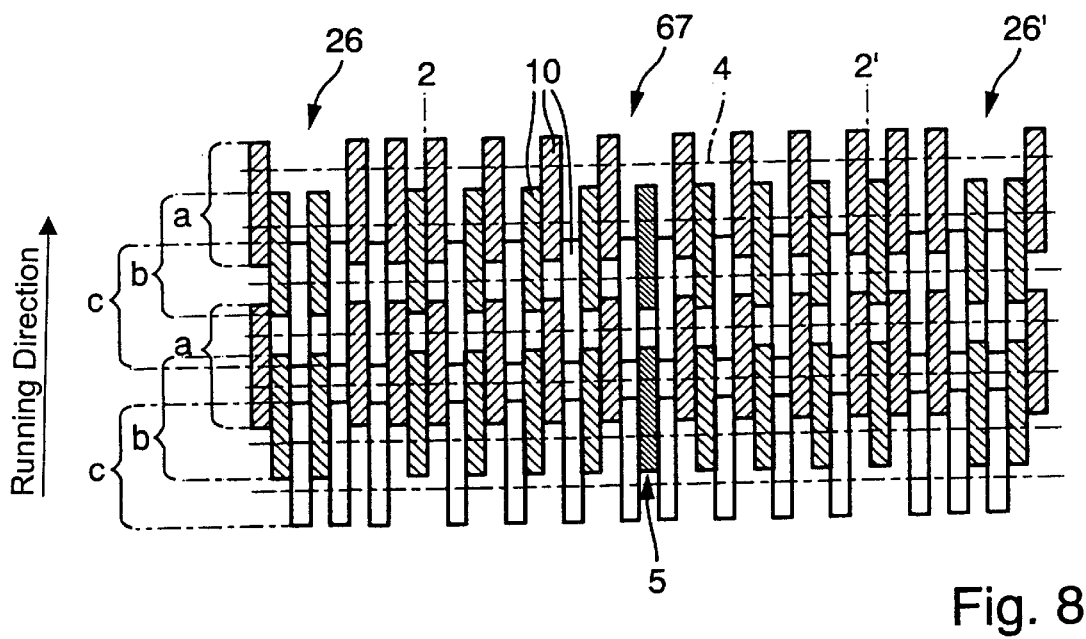
Figure 9:
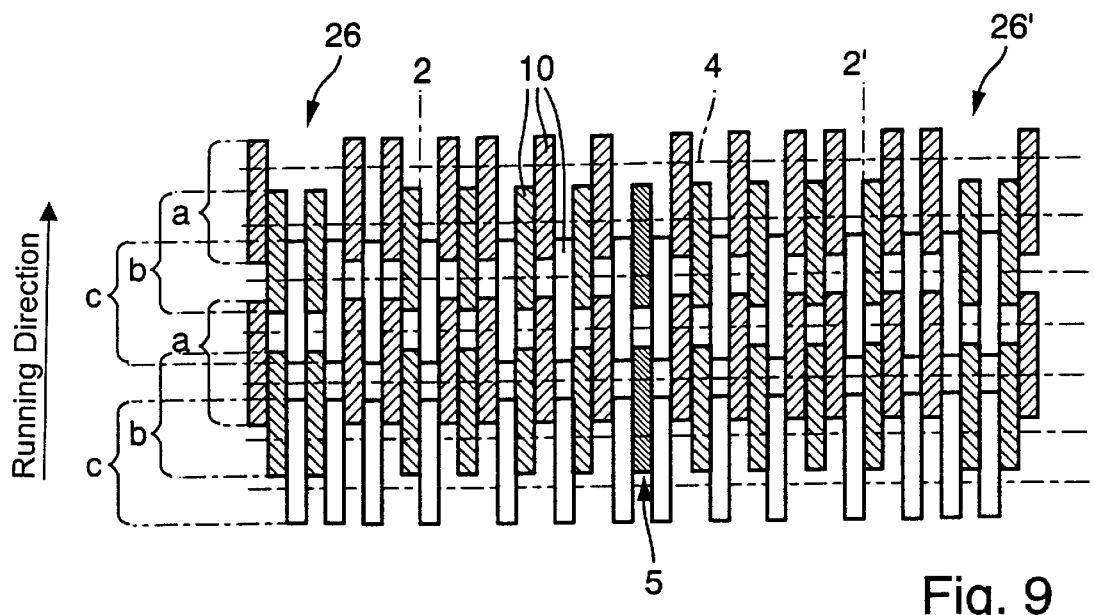

The inner zones 67, 77, 87 of the embodiments shown in FIGS. 8 through 11 have a more regular structure with positions arranged in repetitive triplets. The inner zones 67, 77, 87 are again mirror-symmetric with respect to the median column 5 and, therefore, only one of the symmetric halves is described, starting at the median column. In FIG. 8, the triplet consists of the positions c, a, b and is repeated four times, where the last position b may be counted as part of the border zone 26. In the inner zone of the embodiment of FIG. 9, the triplet is patterned c-a-b, repeated three times and followed by the positions a, c at the transition to the border zone 26.

Figure 10:
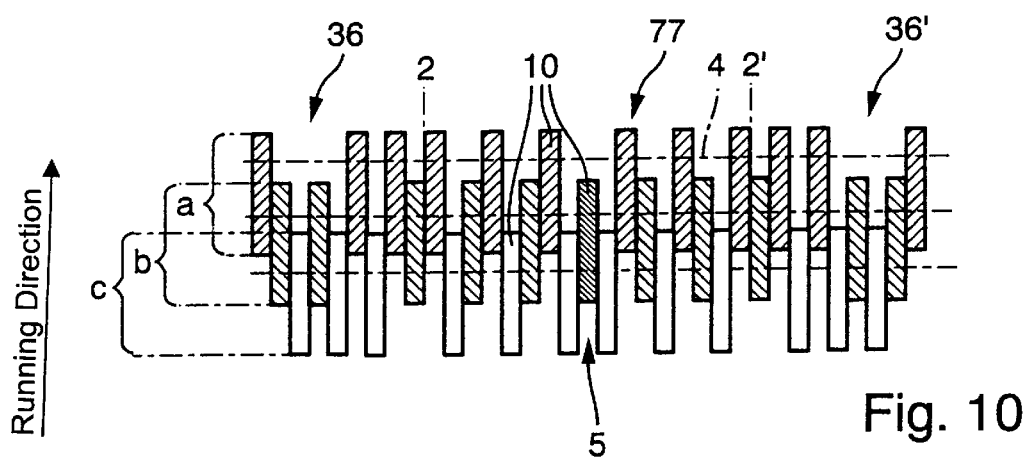

The embodiment of FIG. 10, likewise, is a symmetrically arranged endless flexible torque-transmitting device in which the number of links 10 transverse to the running direction (as indicated by the arrow) is reduced to 35. The positional pattern of the border zones 36, 36', visualized by the dividing lines 2, 2' in the same manner as above, is a-b-c-b-c-a-c-a, starting from the border, while the inner zone 77 has a regular structure with a median link column 5 at position b and on either side three positional triplets c-a-b from the median to the border.

Figure 11:
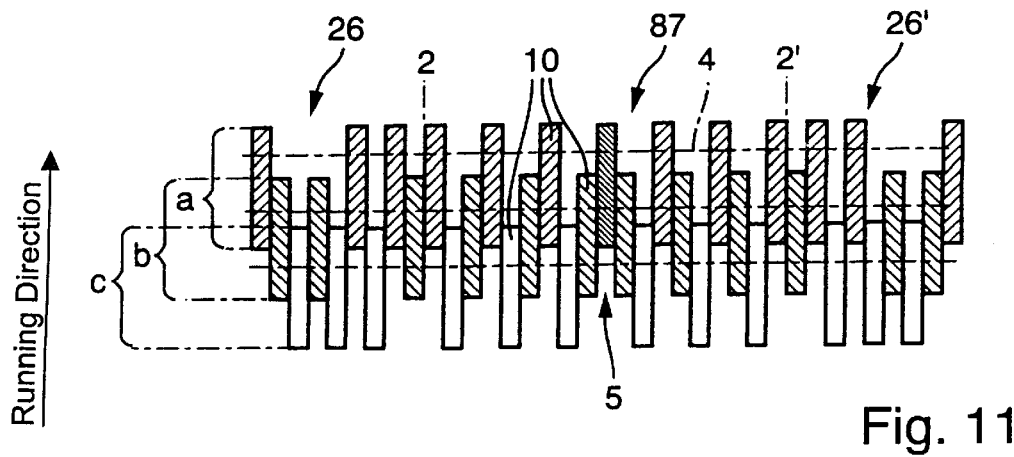

FIG. 11 represents a further embodiment of an endless flexible torque-transmitting device that is symmetric with respect to a median link column 5 allocated to position a and has 37 links transverse to the lengthwise direction (as indicated by the arrow). The border zones 26 are identical to the embodiments of FIGS. 5 through 9, while the inner zone 87, indicated again by the dividing lines 2, 2', has on either side of the median three position triplets c-a-b from the median to the border.

Figure 12:
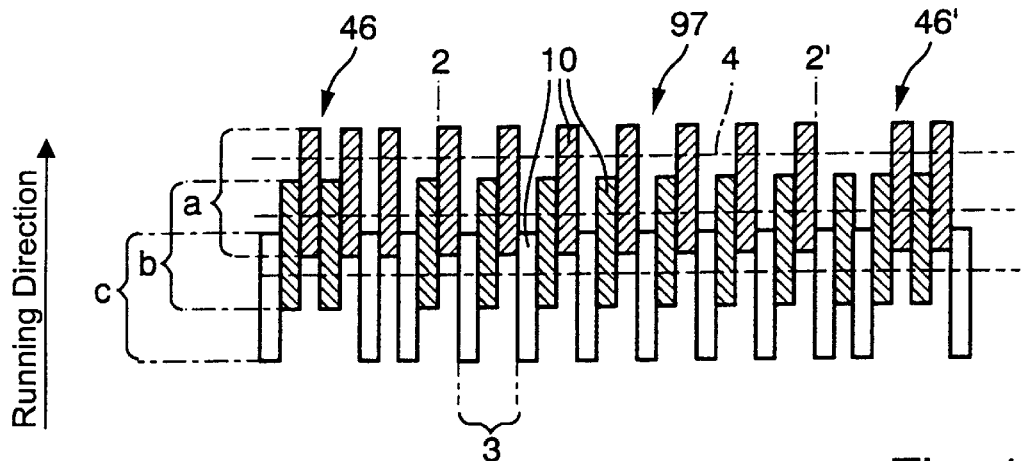
FIGS. 12 and 13 represent segments of embodiments of endless flexible torque-transmitting devices according to the invention with asymmetric occupancy patterns of the link positions.

The embodiment illustrated in FIG. 12 represents an endless flexible torque-transmitting device with a total of 36 links 10 at 36 positions transverse to the running direction. An asymmetric inner zone 97 comprises seven repetitive sequences of the positions c-b-a from the beginning of the inner zone on the left (in FIG. 12) to the end of the inner zone on the right. The border zones, likewise, are asymmetric in relation to each other. The left border zone 46, starting from the border, is patterned as c-b-a-b-a-c-a, while the right border zone 46', starting likewise from the border, is patterned as c-a-b-a-b-c-b-c. It needs to be noted that in this case the right border zone 46' with respect to its width, i.e., transverse to the running direction, has a greater number of positions than the left border zone 46. However, as in some of the other embodiments, the transitions from the border zones 46, 46' to the inner zone, in this case to the inner zone 97, can be fluid, so that certain positions near the dividing line may be allocated to either zone.

Figure 13:
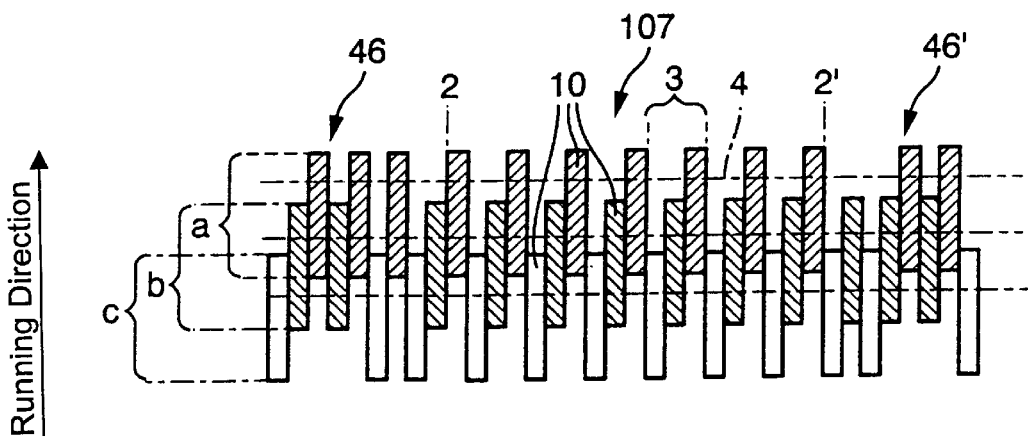

The embodiment illustrated in FIG. 13 of an endless flexible torque-transmitting device according to the invention is identical with the embodiment of FIG. 11, except that the group 3 of positions c, b, a is repeated only six times. This example also illustrates the possibility of an asymmetric arrangement for an odd number of positions transverse to the running direction, such as the 33 positions shown in this example.

Figure 14:
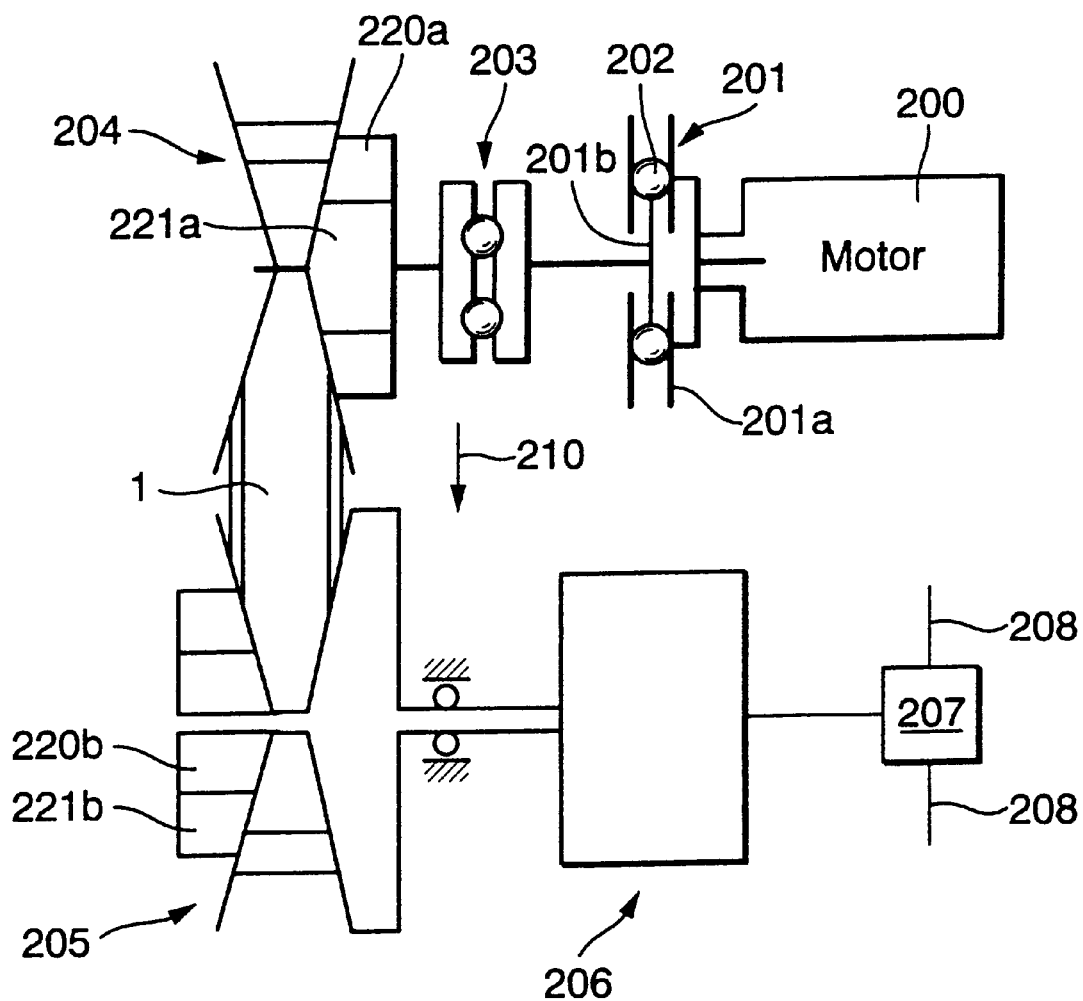
FIG. 14 represents an advantageous installation of an endless flexible torque-transmitting device according to the invention in a continuously variable transmission.

FIG. 14 illustrates schematically how an endless flexible torque-transmitting device 1 according to the invention is used in a continuously variable transmission. The motor 200, through its output shaft, drives an input element 201*a* of a damper 201. Energy-storing devices 202, and in some cases a frictional damping device, are interposed in the torque flow between the input element 201*a* and an output element 201*b*. A torque sensor 203 is arranged in series after the damper 201. The functional details are described, e.g., in the publication DE-OS 42 34 294.

From the torque sensor 203, the torque-flow path continues through a first pair of conical disks 204 with pressure chambers 220*a*, 221*a*. The pressure chambers 220*a*, 221*a* are configured according to the dual-piston principle, where one piston is used to control the transmission ratio and the other for generating the compressive force against the endless flexible torque-transmitting device 1. The function of the dual-piston principle is described, e.g., in the publications DE-OS 42 01 693 and DE-OS 41 34 658. In addition, the older applications DE-OS 42 01 692 and DE-OS 41 34 658 are referenced by the present invention, and their content is expressly included in the substance material disclosed in the present application.

The endless flexible torque-transmitting device 1 transmits the applied torque from the first pair of conical disks 204 to a second pair of conical disks 205 controlled by means of the dual piston 220*b*, 221*b*. The flexible torque-transmitting device 1 is configured as an endless loop.

A rotation-reversing device and a gradual drive-engaging element, as represented by the block 206, may be arranged in series after the second pair of conical disks 205. Furthermore, a rotation-reversing device such as a reversing gear set, and/or a drive-engaging element such as a clutch or a torque converter, may also be arranged ahead of the first disk pair 204.

At the end of the torque-flow path is a differential 207 leading to the two drive axles 208.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. An endless flexible torque-transmitting device with links that are connected to force-transfer elements, as used in particular in a continuously variable transmission of a motor vehicle where the endless flexible torque-transmitting device is arranged in the torque flow between a first pair of conical disks and a second pair of conical disks and where tensile forces are acting along a lengthwise direction of the endless flexible torque-transmitting device, comprising an arrangement of the force-transfer elements and links in which:

a) the force-transfer elements are aligned transverse to the lengthwise direction and distributed at intervals along a circumference of the endless flexible torque-transmitting device;

b) the links have openings that are traversed by the force-transfer elements, whereby columns of links are formed in the lengthwise direction of the endless flexible torque-transmitting device, c) the endless flexible torque-transmitting device, across a width that is transverse to the lengthwise direction and extends between two outermost border columns, has a multitude of columns arranged in an inner zone and two border zones;

d) first, second and third positions (a, b, c) are defined by respective pairs of neighboring force-transfer elements, each first position (a) falling between a neighboring second position (b) and a neighboring third position (c), in such a manner that positions (a), (b), (c) are repeated in uniform periodicity in the lengthwise direction, the links within a given column all occupying the same position, whereby the columns become identifiable by position;

e) an occupancy pattern is defined according to the position occupied by each column of links across the width of the endless flexible torque-transmitting device, with the occupancy pattern of at least one border zone being distinguishable from the occupancy pattern of the inner zone.

2. The endless flexible torque-transmitting device according to claim 1, wherein a position in a row across the width is occupied by at least one link.

3. The endless flexible torque-transmitting device according to claim 1, wherein the occupancy pattern of the border zones, beginning at an outermost border column and proceeding towards the inner zone, is defined by columns occupying at least two of the three positions (a, b, c).

4. The endless flexible torque-transmitting device according to claim 1, wherein the two border zones have the same occupancy pattern.

5. The endless flexible torque-transmitting device according to claim 1, wherein at least one of the columns has at least two side-by-side links occupying the same of the three positions (a, b, c).

6. The endless flexible torque-transmitting device according to claim 5, wherein at least one of the columns at the third and fifth positions—counting from the outermost border column towards the inner zone—in at least one of the two border zones has two side-by-side links occupying the same of the three positions (a, b, c).

7. The endless flexible torque-transmitting device according to claim 1, wherein at least one column is occupied by links that have a greater transverse dimension than the links in other columns.

8. The endless flexible torque-transmitting device according to claim 7, wherein the greater transverse dimension is less than the combined transverse dimension of two of the links that do not have the greater transverse dimension.

9. The endless flexible torque-transmitting device according to claim 7, wherein at least one of the columns at the third and fifth positions—counting from the outermost border column towards the inner zone—in at least one of the two border zones is occupied by links that have a greater transverse dimension than the links in other columns.

10. The endless flexible torque-transmitting device according to claim 1, wherein the endless flexible torque-transmitting device is configured as a triadic array of three distinguishable positions (a, b, c) that are repeated in uniform periodicity along the lengthwise direction, the positions (a) defining first positions, the positions (b) defining second positions transposed from the first positions by one force-transfer element interval, and the positions (c) defining third positions transposed from the first positions by two force-transfer element intervals in the lengthwise direction of the endless flexible torque-transmitting device.

11. The endless flexible torque-transmitting device according to claim 1, wherein the occupancy pattern of at least one of the border zones comprises at least one sequence of positions in the order a-b-c-b, beginning at the outermost border column and proceeding towards the inner zone.

12. The endless flexible torque-transmitting device according to claim 1, wherein the occupancy pattern of at least one of the border zones comprises at least the sequence of positions a-b-c-b-c, beginning at the outermost border column and proceeding towards the inner zone.

13. The endless flexible torque-transmitting device according to claim 1, wherein the occupancy pattern of at least one of the border zones comprises at least the sequence of positions a-b-c-b-c-a, beginning at the outermost border column and proceeding towards the inner zone.

14. The endless flexible torque-transmitting device according to claim 1, wherein the occupancy pattern is symmetric with respect to the transverse directions from a median column towards either of the two border zones.

15. The endless flexible torque-transmitting device according to claim 1, wherein the occupancy pattern of the inner zone is symmetric with respect to the transverse directions from a median column towards either of the two border zones.

16. The endless flexible torque-transmitting device according to claim 1, wherein the occupancy pattern of the inner zone from one border zone to the other border zone is asymmetric with respect to a median line.

17. The endless flexible torque-transmitting device according to claim 1, wherein the occupancy pattern of the inner zone is arbitrary.

18. The endless flexible torque-transmitting device according to claim 1, wherein the occupancy pattern of the inner zone is repeated after an interposed boundary column.

19. The endless flexible torque-transmitting device according to claim 18, wherein the interposed boundary column occupies a position that is different from its neighboring columns.

20. The endless flexible torque-transmitting device according to claim 1, wherein the occupancy pattern of the inner zone comprises at least one repetition of at least one of the sequences a-b-c, b-c-a, and c-b-a.

21. The endless flexible torque-transmitting device according to claim 1, wherein the occupancy pattern of the inner zone comprises at least one repetition of at least one of the sequences c-a and a-c.

22. The endless flexible torque-transmitting device according to claim 1, wherein the intervals between the force-transfer elements are not uniform.

23. The endless flexible torque-transmitting device according to claim 1, wherein the force-transfer elements are comprised of at least two rocker elements rolling on each other.

24. The endless flexible torque-transmitting device according to claim 1, wherein the links are secured against becoming disengaged from the force-transfer elements.

* * * * *